United States Patent [19]
Carlson

[11] Patent Number: 6,031,352
[45] Date of Patent: Feb. 29, 2000

[54] ACTIVE ALTERNATOR LOAD CIRCUIT

[75] Inventor: Dennis A. Carlson, Burnsville, Minn.

[73] Assignee: Wagner Spray Tech Corporation, Minneapolis, Minn.

[21] Appl. No.: 08/644,735

[22] Filed: May 10, 1996

Related U.S. Application Data

[60] Continuation of application No. 07/933,293, Aug. 21, 1992, abandoned, which is a division of application No. 07/851,855, Mar. 16, 1992, abandoned.

[51] Int. Cl.$^7$ .................................................. H02P 5/28
[52] U.S. Cl. .................... 318/811; 318/140; 318/148; 318/461; 318/254; 307/38; 307/31; 361/20; 361/21; 361/91; 361/58; 322/75; 322/80; 322/83
[58] Field of Search .................................. 318/254, 140, 318/786, 785, 461, 148, 811; 417/545, 213, 547, 11, 58, 280, 299, 484; 307/130, 31, 38, 293, 273, 64; 361/20, 58, 21, 91, 18; 323/237, 311, 276, 256; 322/11, 28, 94, 917, 29, 73, 99

[56] References Cited

U.S. PATENT DOCUMENTS

| | | | |
|---|---|---|---|
| 3,003,429 | 10/1961 | Petrusewicz et al. | 417/547 |
| 4,059,771 | 11/1977 | Jacobs et al. | 322/35 |
| 4,164,785 | 8/1979 | Young et al. | 361/20 |
| 4,219,798 | 8/1980 | Frister | 340/52 F |
| 4,384,245 | 5/1983 | Metter | 322/28 |
| 4,401,936 | 8/1983 | Van Opijnen | 322/28 |
| 4,412,158 | 10/1983 | Jefferson et al. | 318/461 |
| 4,659,978 | 4/1987 | Dogadko | 322/91 |
| 4,692,103 | 9/1987 | Anderson | 417/547 |
| 4,782,278 | 11/1988 | Bossi et al. | 318/786 |
| 4,801,247 | 1/1989 | Hashimoto et al. | 417/213 |
| 4,839,575 | 6/1989 | MacFarlane | 361/20 |
| 4,853,557 | 8/1989 | Meier et al. | 307/38 |
| 4,862,053 | 8/1989 | Jordan et al. | 318/785 |
| 4,923,373 | 5/1990 | Rothar et al. | 417/545 |
| 4,958,119 | 9/1990 | Fitzner | 322/91 |
| 5,023,529 | 6/1991 | Miller et al. | 322/73 |
| 5,079,496 | 1/1992 | Pierret et al. | 322/99 |
| 5,080,059 | 1/1992 | Yoshida et al. | 320/72 |
| 5,198,698 | 3/1993 | Paul et al. | 322/11 |
| 5,202,811 | 4/1993 | Minks | 361/56 |
| 5,210,480 | 5/1993 | Iwatani et al. | 322/28 |

*Primary Examiner*—Karen Masih
*Attorney, Agent, or Firm*—Faegre & Benson LLP

[57] ABSTRACT

A control apparatus controlling the operation of pulse width modulator for an electric clutch or electric motor in portable spray painting equipment having a pressure transducer for sensing the pressure, a manually adjustable pressure reference, a comparator type error detector, and a pressure deadband control for inserting a deadband in a pressure control loop with the deadband varying as the pressure reference varies. A fixed deadband is provided below a predetermined low pressure setting to avoid excessive cycling of the control apparatus during low pressure operation. The pulse width modulator control circuit includes compensation for improving input power factor. The clutch control includes an active alternative load circuit switched in when the alternator output voltage is above a predetermined value.

7 Claims, 13 Drawing Sheets

Fig. 4

| CONTROL LOOP CONDITION | JUMPER POSITION | COMPARATOR OUTPUT STATE | | | | DRIVER CIRCUIT TRANSISTOR | | CLUTCH CONDITION |
|---|---|---|---|---|---|---|---|---|
| 22 | 236 | 186 | 196 | 200 | 206 | 219 | 222 | 32 |
| $P_{REF} > P_{ACTUAL}$ | IN | LOW | OPEN | LOW | OPEN | OFF | ON | ON |
| $P_{REF} \leq P_{ACTUAL}$ | IN | HIGH | LOW | HIGH | OPEN | ON | OFF | OFF |
| $P_{REF} < P_{ACTUAL} < P_{REF} - \text{DEADBAND}$ | IN | HOLD PRIOR STATE | HOLD PRIOR STATE | HOLD PRIOR STATE | OPEN | HOLD PRIOR STATE | HOLD PRIOR STATE | HOLD PRIOR STATE |
| X | OUT | X | X | X | LOW | X | OFF | OFF |

238

240, 242, 244, 246, 248

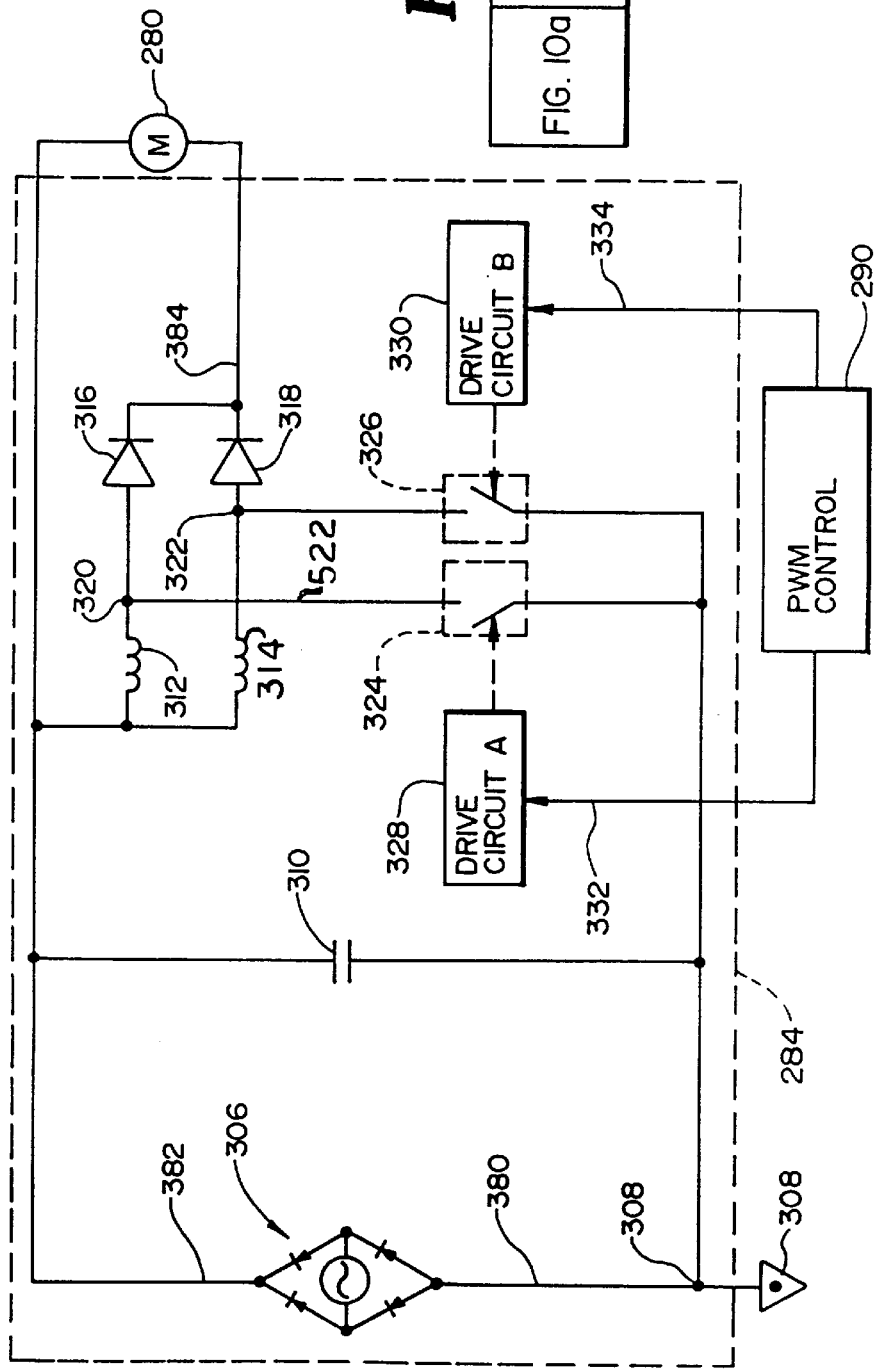

ACTIVE ALTERNATOR LOAD CIRCUIT

This application is continuation of a application Ser. No. 07/933,293, filed on Aug. 21. 1992, which is a division of application Ser. No. 07/851,855, filed on Mar. 16, 1992, both now abandoned.

BACKGROUND OF THE INVENTION

This invention relates to electronic controls for operating piston pumps, particularly for pumping paint in spray painting systems, in systems wherein the piston pump is driven either by an internal combustion engine driving an electric clutch or an electric motor operated from pulse-width modulated control.

BRIEF DESCRIPTION OF THE DRAWINGS

FIG. 3 is a key for FIGS. 3a and 3b.

FIG. 4 is a chart illustrating certain aspects of the operation of the control system of the present invention.

FIG. 9 is a simplified electrical schematic showing various details of the Power Output Section of FIG. 8.

FIG. 10 is a key for FIGS. 10a, 10b, and 10c.

DETAILED DESCRIPTION

Figure 1:
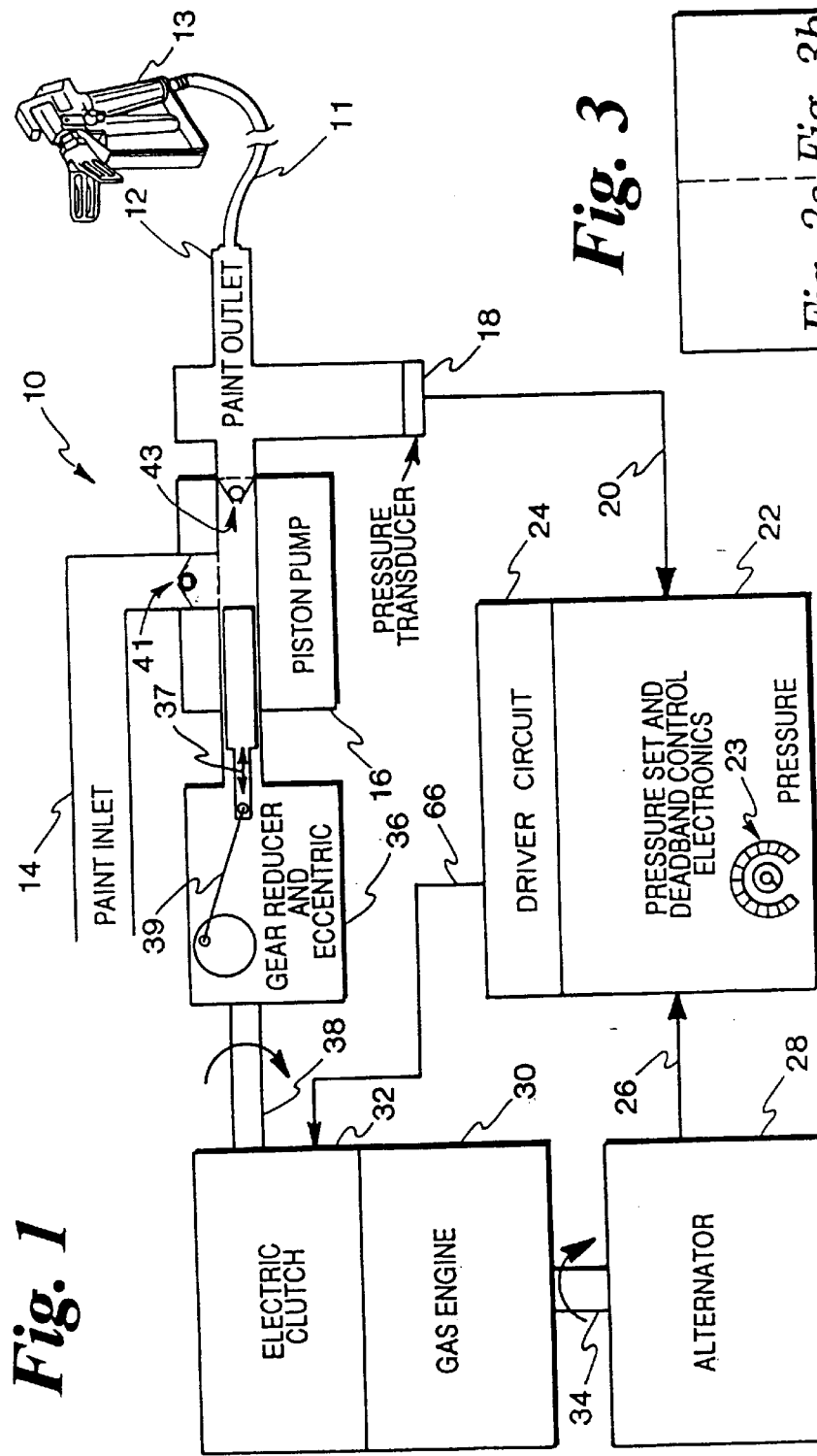
FIG. 1 shows a block diagram of the overall control system in a gasoline engine driven version of the present invention.

Referring now to FIG. 1, the present invention relates to a portable painting system 10 for providing pressurized paint at a paint outlet 12 which is to be understood to be connected via a hose or high pressure tubing 11 to a paint spray gun 13. Paint is supplied from a container (not shown) to a paint inlet 14 such as by way of a conventional syphon or suction tube. The paint is pressurized by a piston pump 16 and the outlet pressure of pump 16 is transduced by a pressure transducer 18 to provide an electrical signal 20 representative of actual pressure. Signal 20 is provided to a pressure set and deadband control electronics subsystem 22 which (in this version) controls a driver circuit 24. A knob or control 23 is available to an operator to set the desired pressure for the system 10. In this version, power for electronics 22 is provided via line 26 from an alternator 28 driven from a prime mover such as an internal combustion engine 30 and an electric clutch 32 which is electrically controllable via line 66 between ON and OFF conditions by driver circuit 24.

It is to be understood that shaft 34 rotates continuously with engine 30, while shaft 38 is selectively rotatable depending upon the state of electric clutch 32. A gear reducer and eccentric drive 36 includes means for converting the rotary motion of shaft 38 to reciprocating motion 37 to actuate the piston in pump 16 by any of a number of conventional means, such as an eccentrically mounted crank arm 39. It is further to be understood that piston pump 16 preferably has inlet and outlet check valves 41, 43 to maintain the pressure in paint outlet 12.

Figure 2:
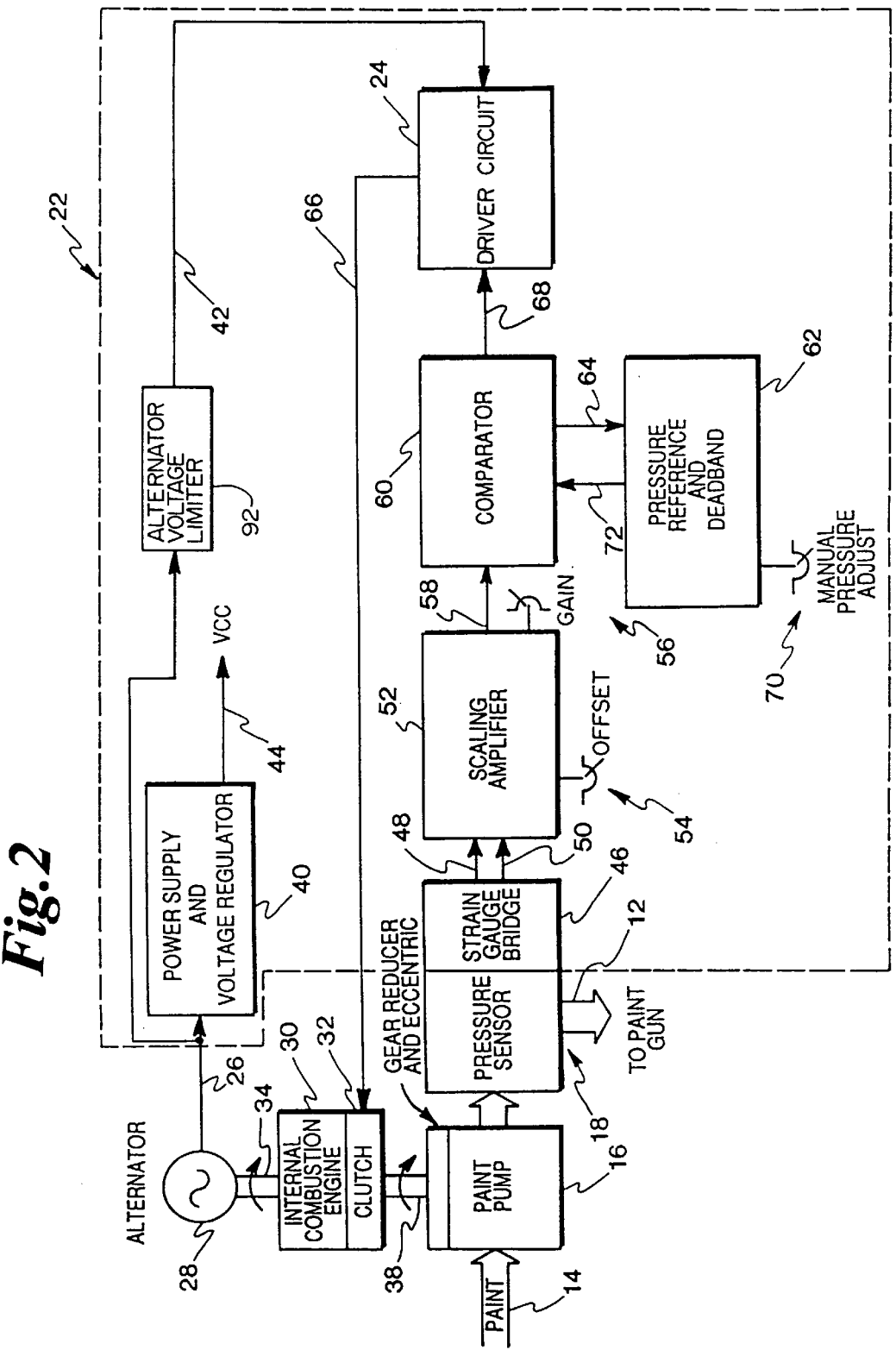
FIG. 2 shows a more detailed block diagram of the control system of FIG. 1.

Referring now also to FIG. 2, it may be seen that electronics subsystem 22 preferably has an alternator voltage limiter 92 providing a DC supply 42 to driver circuit 24 and a power supply and voltage regulator 40 providing a regulated VCC supply 44. Pressure transducer or sensor 18 includes a strain gauge bridge 46 which provides a differential output on lines 48, 50 to a scaling amplifier 52. Amplifier 52 has a bridge output trim adjustment 54 and a max pressure adjustment 56; amplifier subsystem 52 provides an output 58 to a comparator subsystem 60. Comparator subsystem 60 communicates with a pressure reference and deadband subsystem 62 via lines 64, 72 and provides an output 68 to the driver circuit 24. An external manual pressure adjustment 70 is available for adjustment by an operator of system 10 to adjust the set point of the desired pressure of the paint to be supplied to the paint gun at outlet 12. It is to be understood that adjustment 70 is mechanically coupled to knob or control 23.

The electronics subsystem or pressure control loop apparatus 22 controlling the operation of the electromagnetic clutch 32 in the drive train between internal combustion engine 30 and piston pump 16 regulates the output pressure of the pump 16 at outlet 12. Apparatus 22 includes pressure transducer 18 coupled to the output 12 of pump 16. Transducer 18 has an output pressure signal present on lines 48, 50 (which together make up the actual pressure signal 20) representative of the output pressure of pump 16. Apparatus 22 also includes a pressure reference means 70 which is adjustable via control or knob 23 for adjusting the set point or desired pressure signal on line 72. Apparatus 22 also includes the comparator subsystem 60 for comparing the desired pressure signal 72 and the scaled output pressure signal on line 58 and has means for providing a signal on line 68 to energize clutch 32 when the output or actual pressure signal 58 is less than the desired pressure signal 72. Apparatus 22 also includes the pressure reference and deadband control subsystem or pressure deadband control means 62 which inserts a pressure deadband in the pressure control loop 22. The deadband extends from an upper level at which the clutch is turned OFF to a lower level at which the clutch is turned ON. Deadband control 62 shifts the desired pressure signal on line 72 from a higher level to a lower level at the moment when the clutch is turned OFF and from the lower level to the higher level at the moment when the clutch is turned ON. The desired pressure signal is preferably shifted by a voltage level shifter in the deadband control 62 connected to shift the voltage on line 72. It is to be understood that the desired pressure signal originates with the manual pressure adjust means 70 and is modified by the deadband control 62 to provide a modified desired pressure signal on line 72, depending on the state of the comparator subsystem 60 (as indicated by the signal on line 64). It is to be further understood that the state of comparator subsystem 60 corresponds to the state of driver circuit 24 and clutch 32.

Figure 3A:
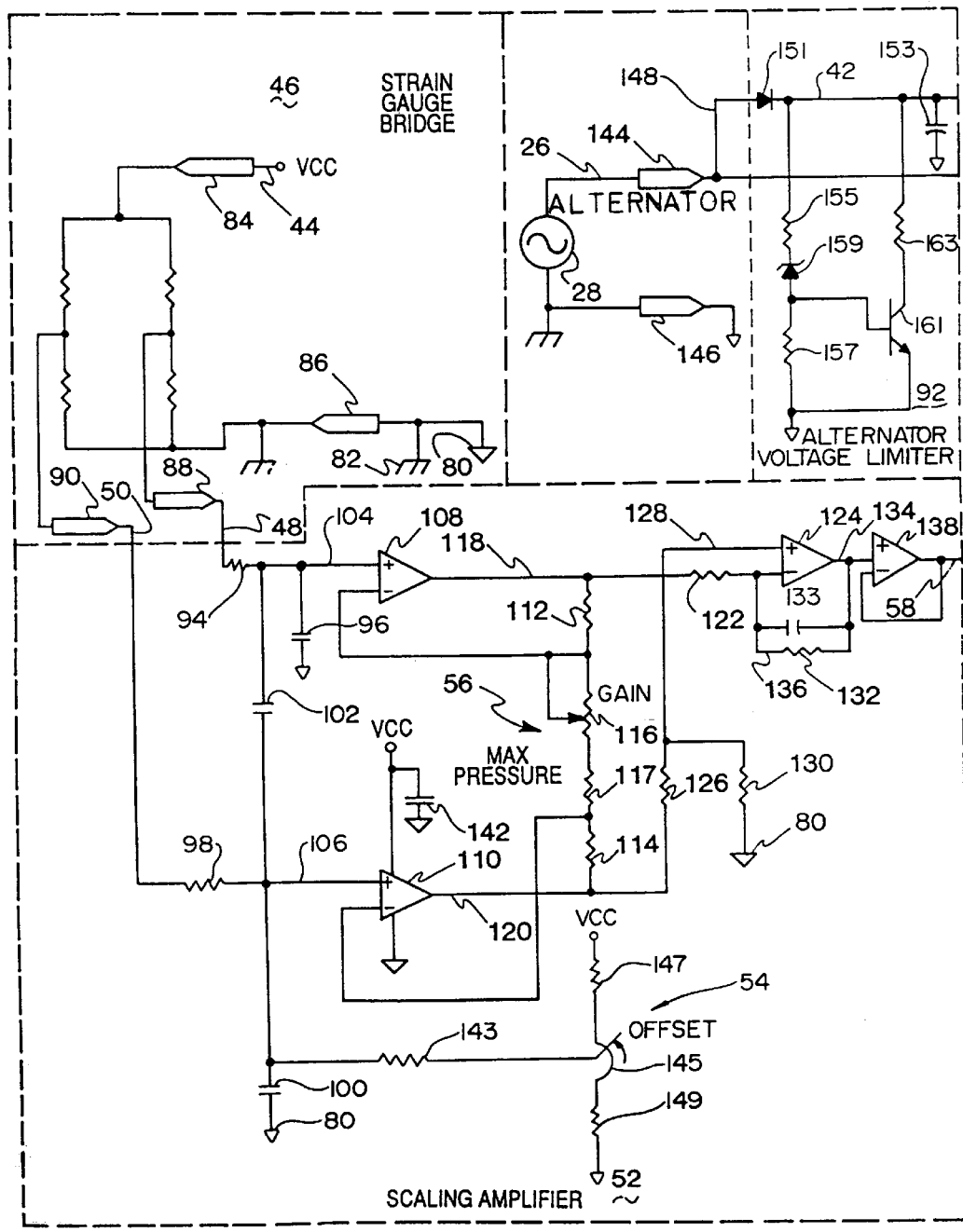
FIGS. 3a and 3b together make up a detailed electrical schematic of the electronic control of FIG. 2.
Figure 3B:
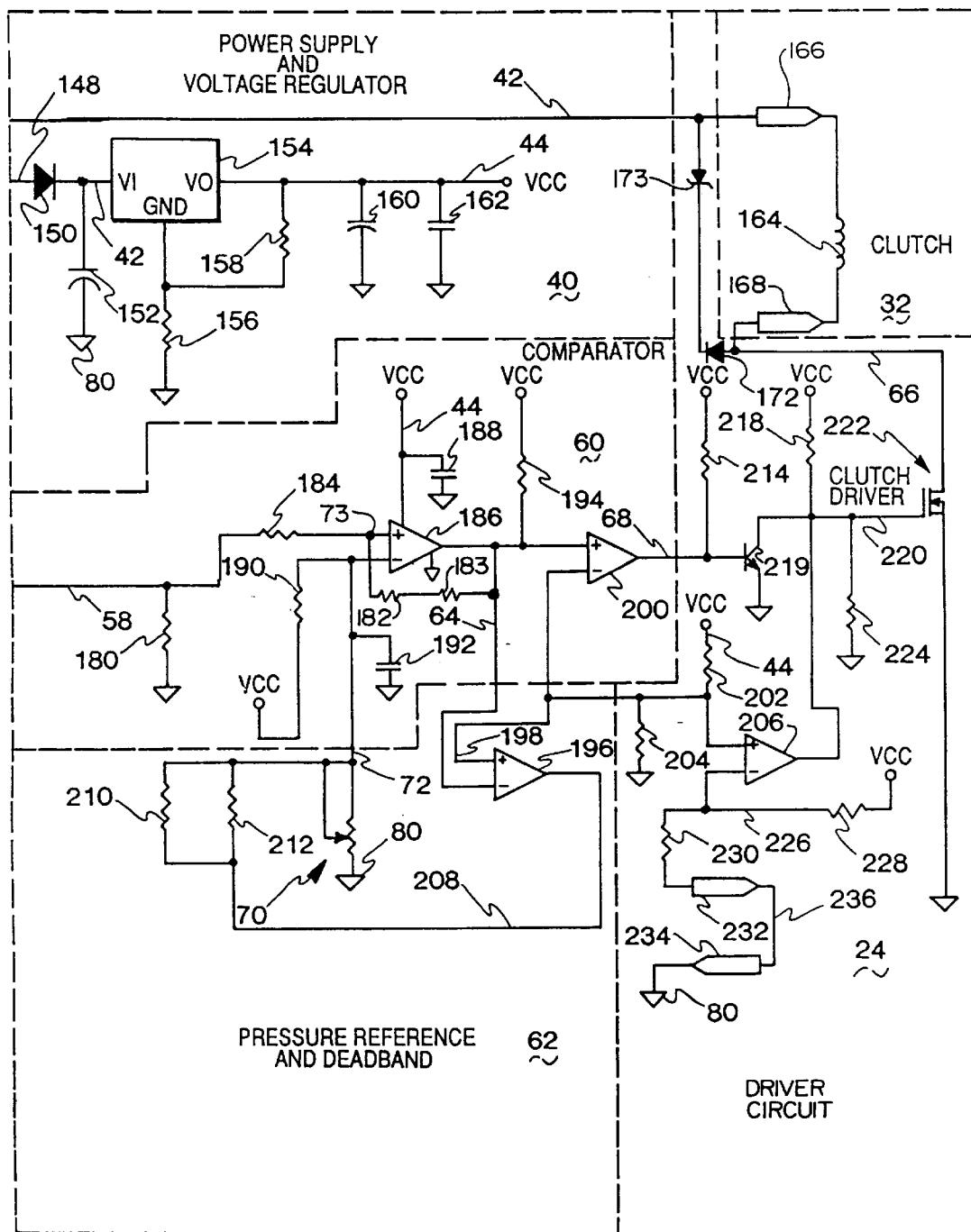

Referring now to FIGS. 3a and 3b, details of the electrical schematic of the pressure control loop may be seen.

Strain gauge bridge 46 preferably utilizes a model PT10 pressure diaphragm as manufactured by Revere Corp. of America, 845 North Colony Road, Wallingford, Conn. 06492. Bridge 46 is preferably connected between VCC 44 and circuit common 80. circuit common 80 is also connected to chassis ground 82. Strain gauge bridge 46 is preferably connected through a cable having detachable connectors 84, 86, 88, 90. It is to be understood the power is supplied to the bridge via connectors 84, 86 and the output of the bridge is supplied through connectors 88, 90 via lines 48, 50 to the scaling amplifier 52. Line 48 is connected through a 1K resistor 94 to line 104. A 0.1 mf capacitor 96 is connected from line 104 to circuit common 80. Similarly, a 1K resistor 98 is connected between lines 50 and 106 and a 0.1 mf capacitor 100 is connected from line 106 to circuit common 80. A 0.1 mf capacitor 102 is connected across lines 104, 106. Each of lines 104, 106 is connected to the non-inverting input of respective operational amplifiers (or "op amps") 108, 110 which are wired in a differential amplifier configuration utilizing a pair of 200K resistors 112, 114 and a 2K rheostat-connected potentiometer 116. A 392 ohm resistor 117 is also connected in series between potentiometer 116 and resistor 114. Output 118 of op amp 108 is connected through a 562K resistor 122 to the inverting input of op amp 124 and output 120 of op amp 110 is connected through a 562K resistor 126 to the non-inverting input 128 of op amp 124. A 562K resistor 130 is connected from input 128 to circuit common 80. A parallel combination of a 562K resistor 132 and a 0.022 mf capacitor 133 are connected between output 134 and the inverting input 136 of op amp 124. Output 134 is connected to the non-inverting input of another op amp 138, connected in a non-inverting, unity-gain configuration and having a output on line 58. It is to be understood that op amps 108, 110, 124, and 138 are preferably formed from a quad op amp integrated circuit (IC) type LM324AN as available from National Semiconductor. A 0.1 mf capacitor 142 is preferably connected between the power supply terminal of the op amp IC and circuit common 80 for noise protection. A 1 meg-ohm resistor 143 is preferably connected between line 106 and a 10K OFFSET potentiometer 145. A pair of 2K resistors 147, 149 provide power to potentiometer 145.

Alternator 28 is also preferably connected to subsystem 22 through a cable having a detachable pair of connectors 144, 146. Connector 146 connects the low side of alternator 28 to circuit common 80 and connector 144 provides a single-ended output from alternator 28 on line 148. The alternator voltage limiter 92 limits the voltage supplied by the alternator to approximately 30 volts. An MR751 type power diode 151 available from Motorola and a 4700 mf capacitor 153 provide a half-wave rectified and filtered voltage on line 42. A pair of 1K resistors 155, 157 are connected in series with a 20 volt zener diode 159 to provide base drive for a TIP110 type transistor 161 also available from Motorola. A 120 ohm resistor 163 is connected between line 42 and the collector of transistor 161. The alternator voltage limiter 92 turns on when the clutch is turned OFF to prevent the alternator voltage from rising in an uncontrolled fashion to an unacceptably high level for voltage regulator 154 in circuit 40. When limiter 92 turns ON, it provides an active alternative load for alternator 28 (i.e., alternative to clutch winding 164).

Referring now more particularly to FIG. 3b, the alternator output on line 148 is provided to the power supply and voltage regulator subsystem 40 and is rectified by diode 150 and filtered by a 470 mf capacitor 152 before being supplied on line 42 to an integrated circuit voltage regulator 154 which may be a type LM317T as available from National Semiconductor. Voltage regulator 154 is connected with a 2.43K resistor 156 and a 422 ohm resistor 158. The output of regulator 154 is preferably 8.35 volts on the VCC line 44. A 100 mf capacitor 160 and a 0.1 mf capacitor 162 provide filtering for the regulated DC supply 44. The DC supply line 42 is provided to driver circuit 24 and to clutch winding 164 of clutch 32 through connector 166. A second connector 168 completes the electrical circuit from clutch winding 164 to line 66 in driver circuit 24. A conventional diode 172 and a 15 volt 5 watt zener diode 173 are connected across clutch winding 164 at lines 42, 66.

The scaled output of the pressure feedback signal on line 58 is supplied to comparator subsystem 60. Line 58 is connected to a 1K resistor 180 and a 10K resistor 184. Resistor 184 is connected to a non-inverting input 73 of a comparator 186. Comparator 186 has a 0.1 mf noise suppression capacitor 188 connected to its positive supply terminal which is also connected to VCC 44. The inverting input 72 of comparator 186 is connected to a 6.19K resistor 190 and a 0.1 mf capacitor 192 in addition to the external manual pressure adjustment means or potentiometer 70 connected in a rheostat configuration between line 72 and circuit common 80. A 200K resistor 182 and a 13.3K resistor 183 are connected between non-inverting input 73 and output 64 of comparator 186 to give a fixed amount of hysteresis or deadband at low pressure settings of the adjustment 70. Output 64 of comparator 186 has a 10K pull-up resistor 194 connected to VCC 44 and is further connected to the inverting input of a deadband comparator 196. Line 198 is connected to the non-inverting input of comparator 196 and the inverting input of an output comparator 200 and is also connected to a voltage divider connected across VCC 44 made up of a pair of 10K resistors 202, 204. The output 198 of the resistive voltage divider made up of resistors 202 and 204 is also connected to the non-inverting input of a lock-out comparator 206. Deadband comparator 196 has an output 208 connected to a pair of 56.2K resistors 210, 212 connected to the pressure reference command line 72. Output line 68 of comparator 200 has a 10K pull-up resistor 214 connected to VCC 44 and is also connected to the base of a type 2N2222 transistor 219. Transistor 219 has a 510 ohm collector resistor 218 and is connected to the gate 220 of a type IRF522 FET transistor 222 available from International Rectifier. A 51K pull-down resistor 224 is also connected to gate 220.

Comparator 206 has its inverting input 226 connected between a 10K resistor 228 and a 100 ohm resistor 230. Resistor 230 is connected through connectors 232 and 234 via a jumper 236 to circuit common 80. It is to be understood that jumper 236 is in the cable and connector assembly coupling strain gauge bridge 46 to the scaling amplifier 52 such that when then strain gauge 46 is disconnected from scaling amplifier 52, jumper 236 is removed via connectors 232, 234, opening the circuit between resistor 230 and circuit common 80.

It is to be understood that comparators 186, 196, 200 and 206 are preferably formed of a quad comparator integrated circuit available from National Semiconductor as a type LM339N. This type of comparator has an open-collector type output.

Referring now also to FIG. 4, the adjustment and operation of the circuit is as follows. With the system 10 OFF (i.e., at zero pressure) the Manual Pressure is set to its maximum value and the Gain adjustment 56 is set at approximately its mid range point by adjusting potentiometer 116. The Offset adjustment 54 is then set to obtain 0.060 volts at the output of op amp 138 by adjusting potentiometer 145. System 10 is then started and the Gain adjustment 56 is set (via potentiometer 116) to provide the highest pressure desired with the Manual Pressure adjustment 70 at its highest setting. The Manual Pressure adjustment control 23 and potentiometer 70 is subsequently available for an operator to select the operating pressure of control loop 22, which may, for example, be between 500 and 3000 PSI at outlet 12.

It is to be understood that there is an OFF threshold at the low pressure end of the Manual Pressure adjustment potentiometer 70 provided by the 60 mV output from the scaling amplifier 52 at zero pressure. Providing such a biased scaling amplifier output at zero pressure forces the driver circuit to remain OFF when an operator calls for zero pressure through adjustment 70. In addition, the fixed deadband of 200 PSI below approximately 500 PSI avoids excessive ON-OFF cycling that could occur when the amplitude of pressure variations arising from piston pump operation exceed the deadband. Stated another way, it is desirable to have a reduced deadband with a reduced level of operating pressure (to improve pressure regulation as a function of set point—which in turn improves painting performance).

However, there is a limit to reducing deadband in proportion to set point which is reached when the pressure "swing" or pressure variations caused by piston pump operation exceeds the deadband. Going beyond this limit (i.e. operating at a very low pressure set point with a small deadband) will result in excessive cycling of the driver circuit and the clutch or other prime mover driving the piston pump. The positive feedback through resistors 182, 183 provides a fixed deadband below a predetermined value (e.g. 500 PSI) of the desired pressure signal and eliminates or blocks excessive cycling at low set point pressures.

To operate system 10 the gas engine 30 is started and a variable pressure set point is manually selected by the operator by adjusting control 23 which is mechanically coupled to the Pressure adjustment means 70. This results in a pressure reference signal adjustment on line 72. If the actual pressure at outlet 12 is below the level set by the signal on lead 72, comparator subsystem 60 will command driver circuit 24 and clutch 32 to turn ON, increasing the actual pressure. Piston pump 16 is then reciprocated until pressure transducer 18 indicates that the pressure at paint outlet 12 has reached the set point. Once the set point is reached, the comparator subsystem 60 commands the driver circuit 24 and clutch 32 to turn OFF. Deadband comparator 196 will then change state, automatically lowering the signal on lead 72 by the amount of the deadband, and the control loop 22 will remain satisfied, holding driver circuit 24 and clutch 32 OFF until the actual pressure falls below the original level of the reference pressure by the amount of the deadband. The deadband provides system stability in the face of pulsing output caused by pump 16 being a piston pump with its characteristic reciprocating pressure output. It is to be understood that the hose 11 connected to the paint outlet 12 is sufficiently long and resilient to act as an accumulator or reservoir, damping pulsations or oscillations in the actual pressure. In the event that the strain gauge bridge 46 is disconnected from the scaling amplifier 52, jumper 236 opens the voltage divider circuit at the inverting input 226 of lock-out comparator 206, causing the comparator 206 to go to a low, forcing a low output state on line 220 "locking-out" further operation of the clutch 32, thus holding the clutch OFF in the absence of pressure feedback.

Reconnecting the strain gauge connector will also reconnect jumper 236, resetting comparator 206 to an open output condition, thus enabling driver circuit 24 to respond to appropriate ON and OFF commands on line 68 when pressure feedback is provided by the pressure transducer 18.

In FIG. 4 chart 238 illustrates various aspects of the operation of the present invention. Row 240 indicates the reference numerals in the previous figures to which the subsequent conditions pertain. Row 242 indicates that operation of the present invention when the reference pressure, $P_{REF}$, is greater than the actual pressure $P_{ACTUAL}$. In this condition of control loop 22, (with jumper 236 in the circuit) the output of comparator 186 is low, comparator 196 has an open output condition, comparator 200 has a low output condition and comparator 206 has an open output condition. At this time clutch driver transistor 219 is OFF and the output FET transistor 222 is ON, turning on clutch 32 causing pump 16 to operate and build the actual pressure.

Referring now to row 244, once the actual pressure equals or exceeds the reference pressure, comparators 186, 196 and 200 change states, along with the clutch driver transistors, turning the clutch OFF. When the control loop passes through the deadband as indicated in row 246, the comparator state outputs remain in their previous state, as do the clutch driver transistors and the clutch itself. Thus if the clutch was ON when the control loop entered the deadband, it will remain ON in the deadband, and if the control loop entered the deadband from the clutch OFF condition, the clutch will remain OFF in the deadband.

Row 248 illustrates the circumstance when the strain gauge or pressure sensor cable is disconnected, opening the circuit by disconnecting jumper 236. At this time the output of comparator 206 is driven to a low condition holding transistor 222 OFF, thus keeping clutch 32 OFF. The condition of control loop 22 in general, and the output states of comparators 186, 196 and 200 in particular are "don't-care" conditions in this circumstance since the open jumper overrides the pressure control loop.

Figure 5:
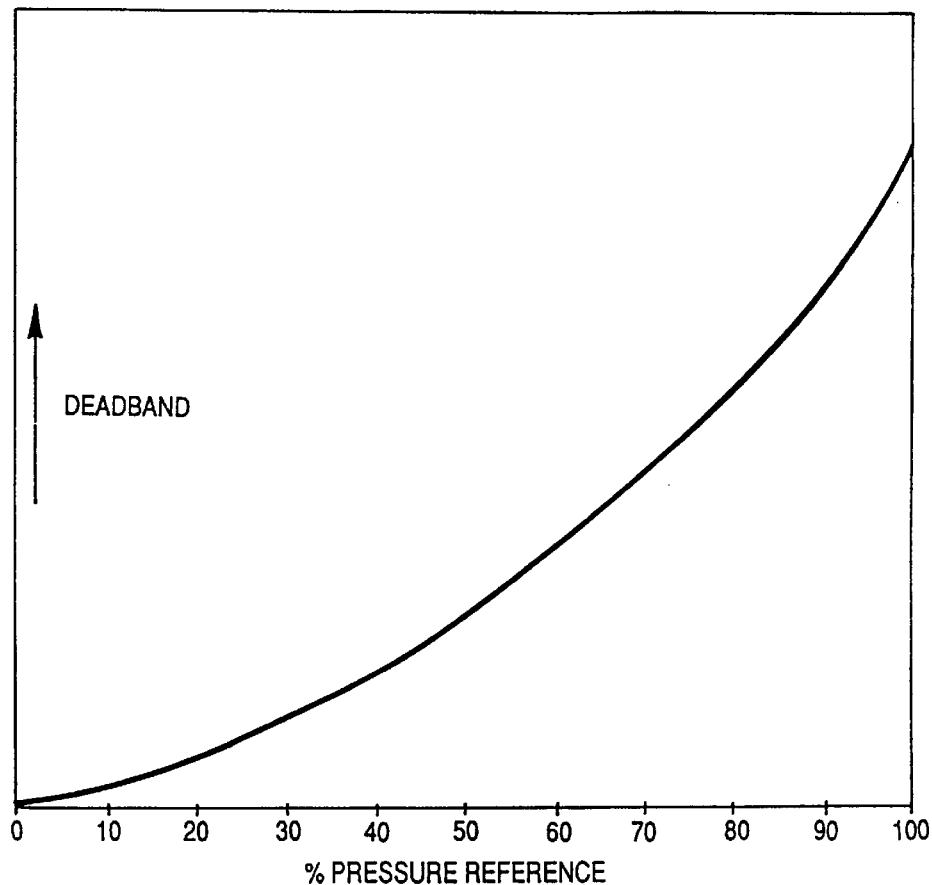
FIG. 5 is a graph of the change in deadband versus the percent setting of the pressure reference of the present invention.
Figure 6:
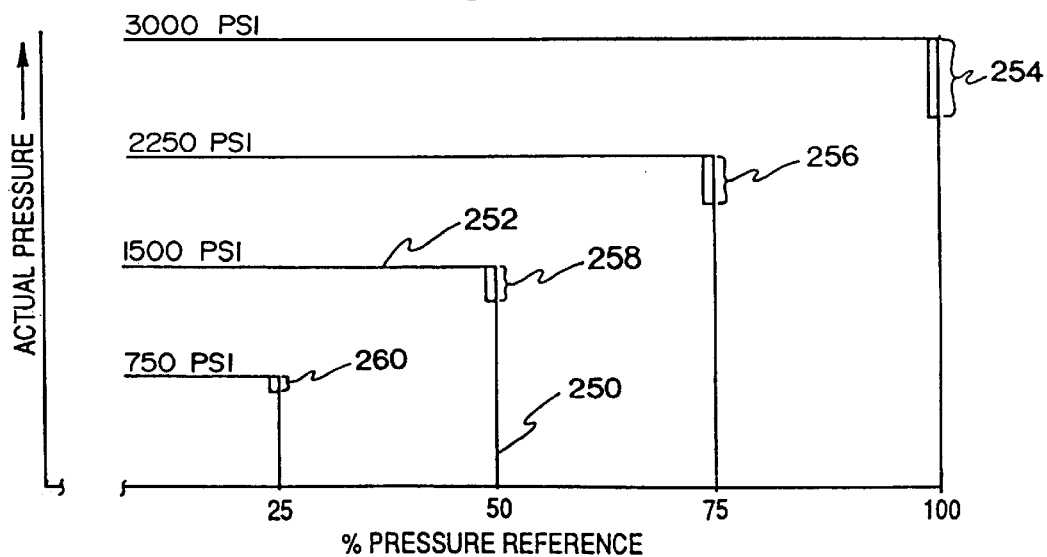
FIG. 6 is a bar chart illustrating the change in deadband with respect to the setting of the pressure reference of the present invention.

Referring now also to FIGS. 5 and 6, it may be seen that the control 22 provides for deadband increases with increasing pressure reference. For example, at 100% reference, corresponding to a 3000 PSI set point (which preferably corresponds to 5 volts on $P_{REF}$ line 72), the deadband 254 has been measured at approximately 519 PSI, while at 2250 PSI set point the deadband 256 is approximately 362 PSI; at 1500 PSI set point the deadband 258 is approximately 288 PSI, and at 750 PSI set point the deadband 260 is approximately 220 PSI. It is to be understood that in practice the system will ordinarily have substantial pressure variations or pulsations due to the nature of the instantaneous pressure output of a piston type pump such as is used in this system 10.

It is to be further understood that the pressure reference and deadband control 62 inserts a deadband and adjusts the deadband in proportion to the pressure reference setting such that at high settings a larger deadband is inserted into the control loop and at lower settings of the pressure reference a smaller deadband is inserted into the control loop. Below a predetermined value or setting it has been found preferable to fix or hold the deadband to a minimum value.

It has been found that the useful lower end of the operating range of this invention is approximately 25% pressure reference. While an operating range of 500 to 2000 PSI has been found adequate for presently known applications of this invention, it is to be understood that the high and low end points of the range and the deadband values may be varied in the practice of this invention.

Figure 7:
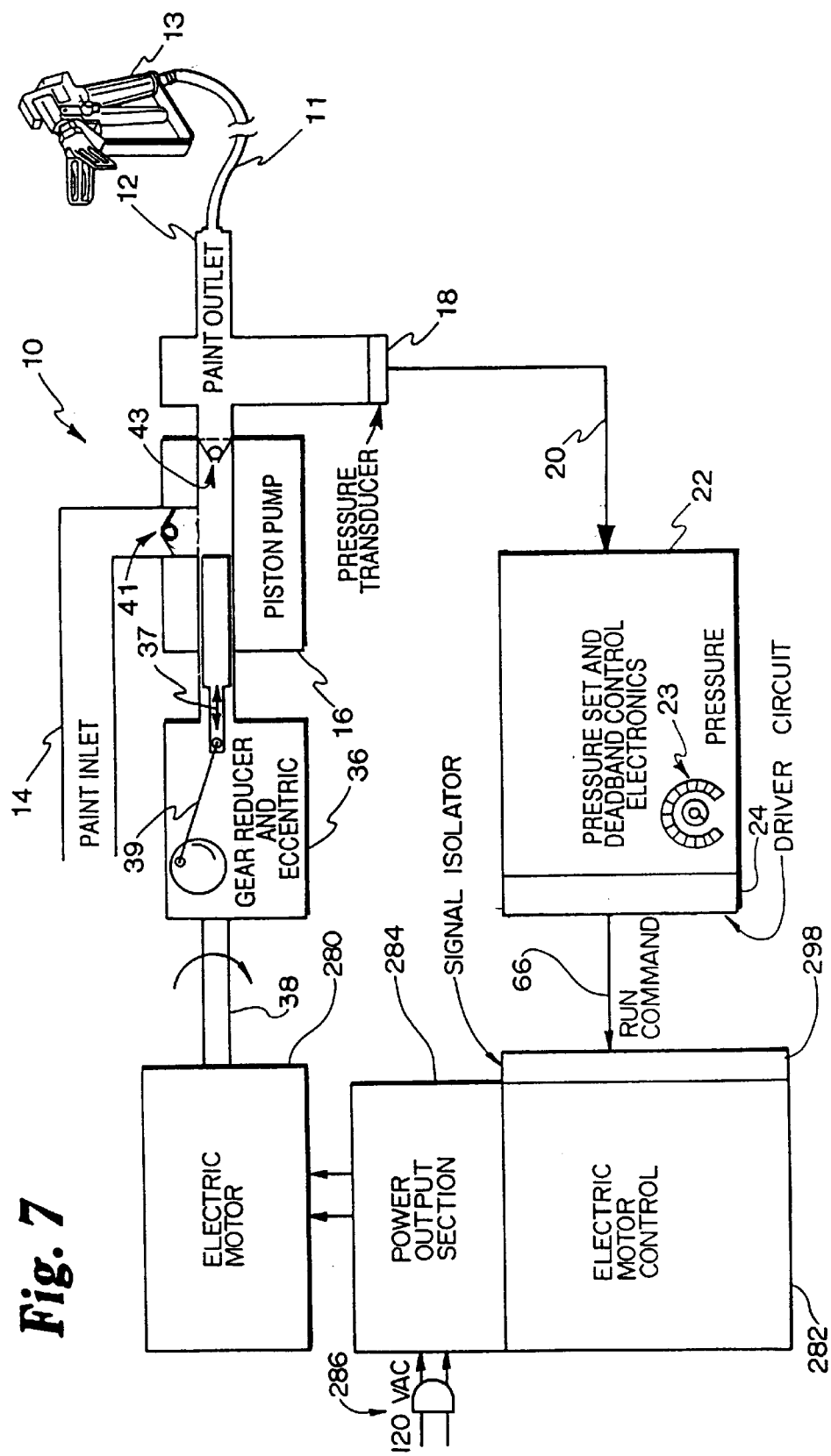
FIG. 7 shows a block diagram of the electric motor driven version of the present invention.

Referring now to FIG. 7, an alternative embodiment 10' of the present invention may be seen. The block diagram of FIG. 7 is the same as that for FIG. 1 except that the gas engine 30 (including alternator 28), and electric clutch 32 have been replaced by an electric motor 280 as an alternative prime mover, and control 282 and Power Output Section 284 are added to operate motor 280. In this embodiment, an isolator circuit 298 is also used. Control 282 has a Power Output Section 284 supplied with conventional AC power as indicated by plug 286. A RUN command signal replaces the clutch ON-OFF signal on line 66 (see FIGS. 2, 7 and 8) and turns on the motor 280 via control 282 in a manner analogous to that of the system previously described which uses clutch 32.

Figure 8:
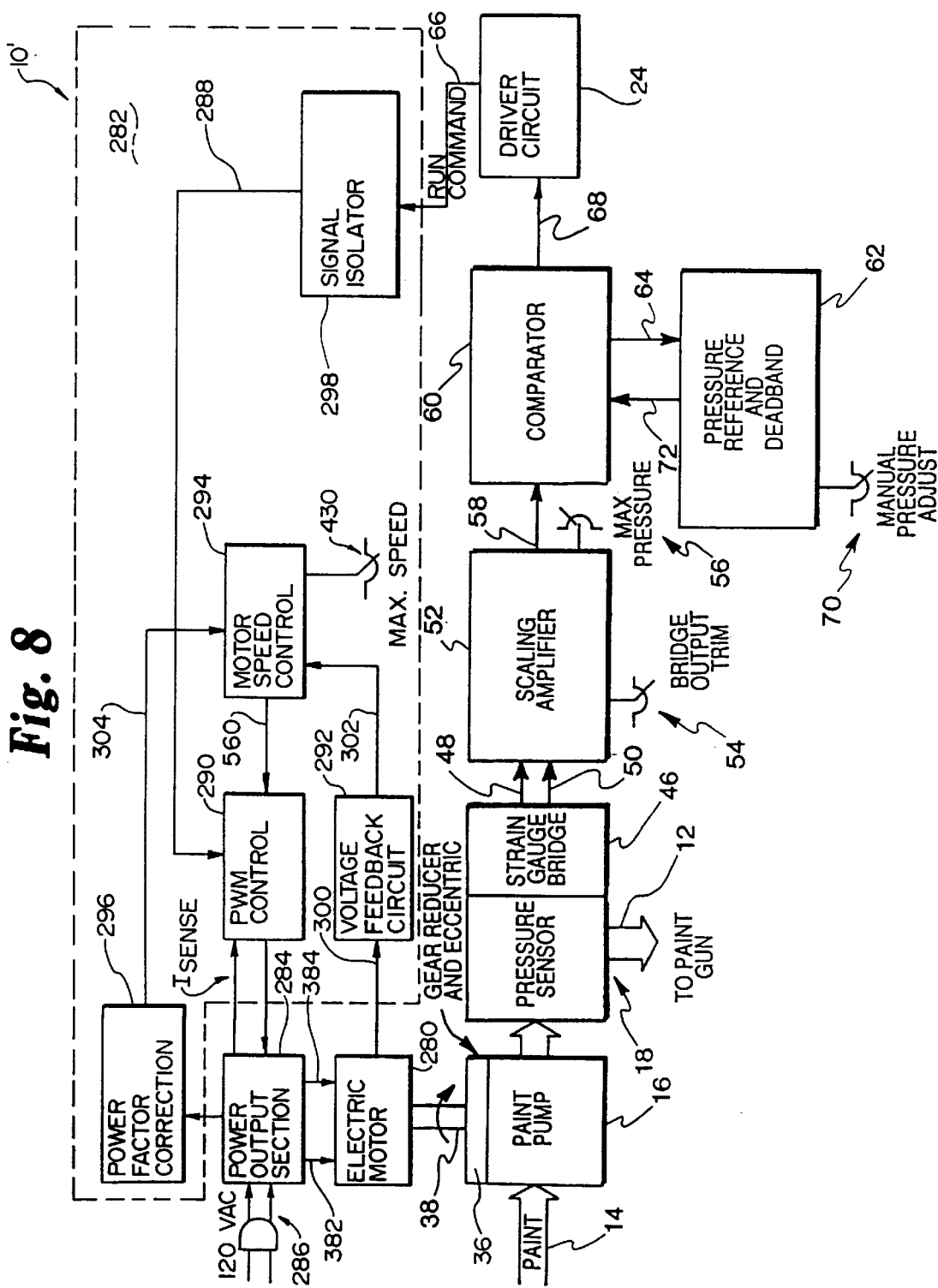
FIG. 8 is a more detailed block diagram of the system shown in FIG. 7.

Referring now to FIG. 8, Electric Motor Control 282 includes a PWM Control 290, a Voltage Feedback Circuit 292, a Motor Speed Control 294, a Power Factor Correction Circuit 296, and a Signal Isolator Circuit 298. Signal Isolator Circuit 298 receives the output 66 of Driver Circuit 24 as the RUN command on line 66 and isolates this signal for PWM Control 290.

In a preferred form of the alternative embodiment 10' shown in FIGS. 7 and 8, electric motor 280 is preferably a DC type motor operated with a fixed field such that the differential voltage 300 across the motor armature is converted to a single-ended, scaled voltage on line 302 proportional to the speed of the motor shaft 38. The Power Factor Correction circuit 296 provides a trim signal on line 304 to correct or improve the apparent power factor of system 10' as seen by power or AC line supply 286.

Referring now more particularly to FIG. 9, various details of the Power Output Section 284 may be seen. Power is supplied via a full-wave diode bridge 306. One side 380 of bridge 306 is connected to circuit common 308. The other side 382 of bridge 306 is provided to motor 280. A 20 mf capacitor 310 serves as a local energy source for a pair of energy storage inductors 312, 314. Inductors 312, 314 are connected through a pair of diodes 316, 318, which may be a type MUR3060 available from Motorola. Inductors 312, 314 are preferably each 30 uH. Nodes 320, 322 are alternately pulled to common 308 by a pair of switching circuits 324, 326. Although shown as mechanical switches, it is to be understood that each of switching circuits 324, 326 are preferably made up of high power field effect transistors or FET'S. Circuits 324, 326 are controlled by Drive circuits 328, 330, respectively. Drive circuits 328, 330 are operated via lines 332, 334 from PWM Control 290.

Figure 10A:
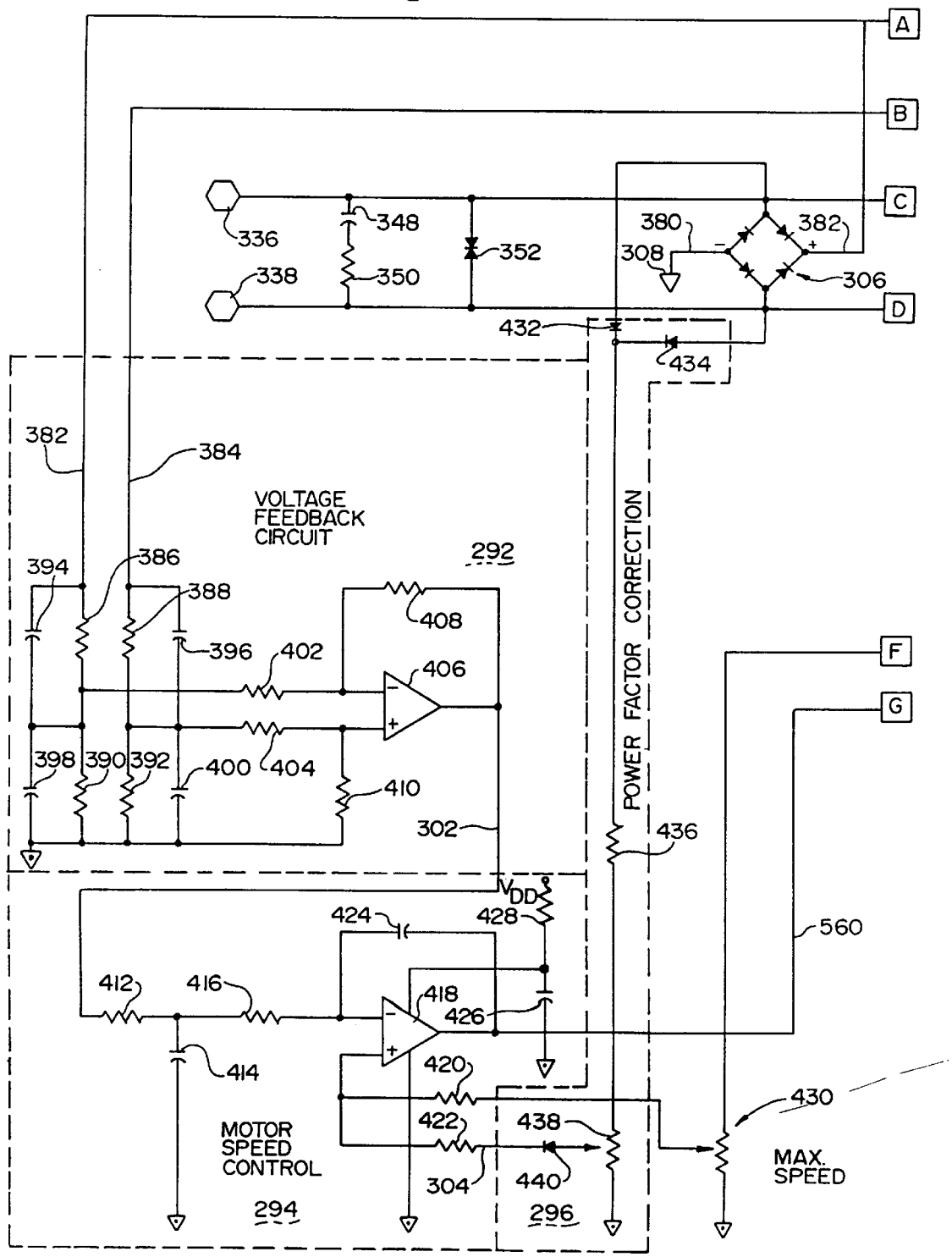
FIGS. 10a, 10b and 10c together make up a detailed electrical schematic of the electric motor control version of the present invention utilizing a Pulse Width Modulator (PWM).
Figure 10B:
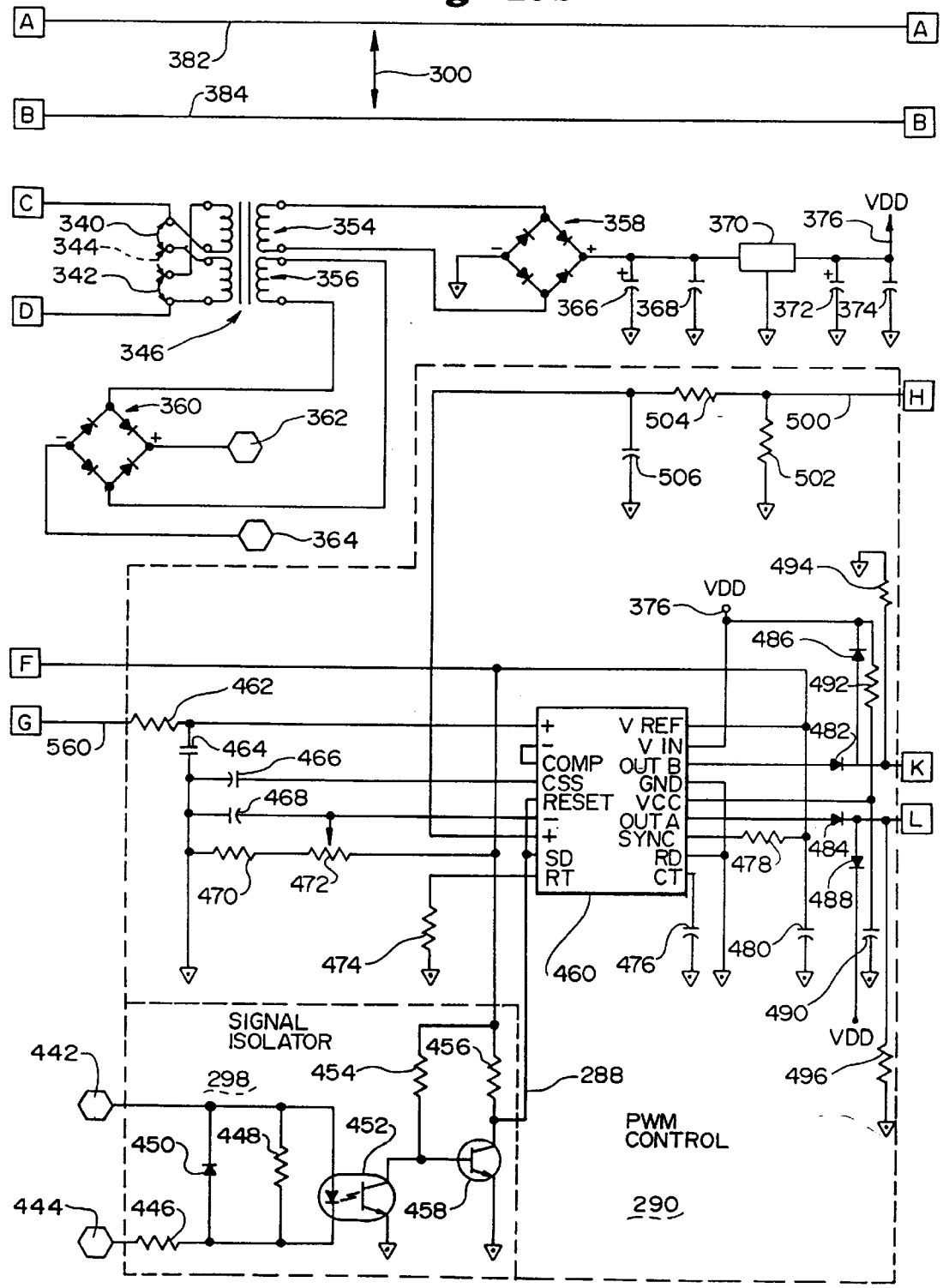
Figure 10C:
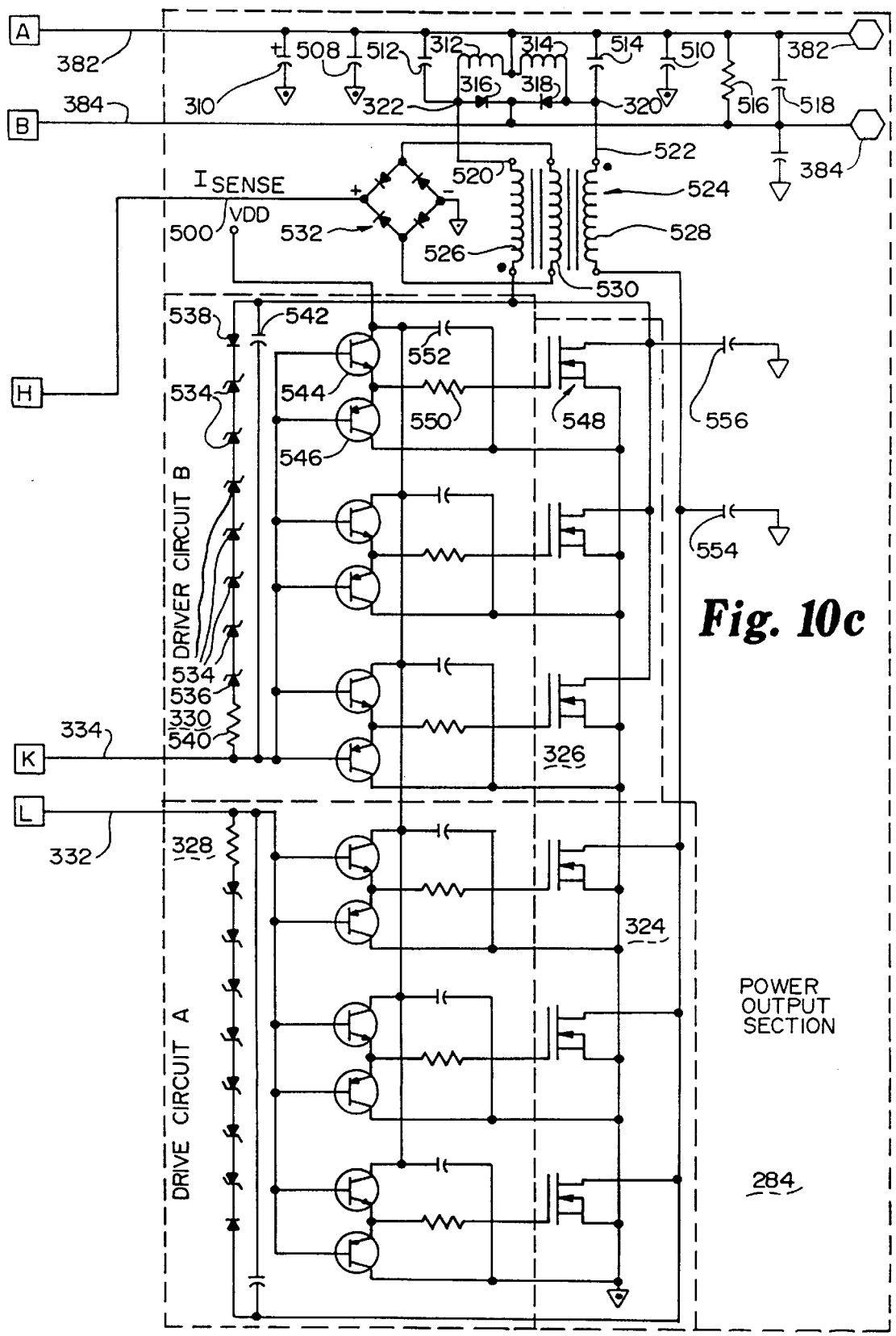

Referring now more particularly to FIGS. 10a, 10b and 10c, a detailed electrical schematic of the Electric Motor Control 282 and Power Output Section 284 may be seen. Power is supplied from a conventional AC power line to the circuit via terminals 336, 338. The circuit is designed to operate from either 115 VAC or 230 VAC. To convert from 115 VAC operation to 230 VAC operation, jumpers 340 and 342 are removed and jumper 344 is installed. This changes the taps on transformer 346 appropriately (see FIG. 10b). Input transients are snubbed by a 0.25 uf capacitor 348, a 100 ohm resistor 350 and a 250 VAC MOV 352. Transformer 346 has a pair of secondaries 354, 356, each of which supplies a pair of full-wave bridges 358, 360 respectively. Full-wave rectified power appears at terminals 362, 364 which can be connected to terminals 144, 146 in place of alternator 28 to provide power to the pressure set and deadband control electronics 22. Bridge 358 supplies unregulated DC power at approximately 20 volts, filtered by a 470 uf capacitor 366 and a 0.1 uf capacitor 368 to a 15 volt linear regulator 370 whose output is filtered by a 10 uf capacitor 372 and a 0.1 uf capacitor 374. The 15 volt regulated output is identified as VDD throughout the schematic of FIGS. 10a, 10b and 10c. It is to be understood that the circuit common 308 of the schematic of FIGS. 10a, 10b and 10c is circuit common for the Electric Motor Control 282 and is different from circuit common 80 for the pressure set and deadband control electronics 22. Isolation between the circuit commons 80 and 308 is achieved by isolated secondary 356 and Signal Isolator 298.

Referring now to Voltage Feedback Circuit 292, in FIGS. 8 and 10a, the differential voltage 300 across electric motor 280 appears at terminals or lines 382, 384 and is converted by the Voltage Feedback Circuit 292 to a single-ended voltage signal 302 representative of motor voltage. Voltage Feedback Circuit 292 is made up of a pair of 220K resistors 386, 388, a pair of 2.2K resistors 390, 392, a pair of 0.001 uf capacitors 394, 396, and a pair of 0.1 uf capacitors 398, 400. These resistor-capacitor combinations provide voltage scaling for both DC and AC components of the differential motor voltage 300 which is then supplied via a pair of 10K resistors 402, 404 to a type LM358A operational amplifier 406. A pair of 49.9K resistors 408, 410 are also connected to op amp 406. A motor voltage feedback signal on line 302 is provided through a 1K resistor 412 to Motor Speed Control circuit 294. The signal on line 302 is filtered by a 0.1 uf capacitor 414 and is then passed through a 100K resistor 416 before being delivered to op amp 418. It is to be understood that op amp 418 is preferably part of the same integrated circuit as that containing op amp 406. Motor Speed Control 294 also includes a pair of 100K resistors 420, 422, a pair of 0.1 uf capacitors 424, 426 and a 10 ohm noise suppression resistor 428. A speed reference signal is supplied to the Motor Speed Control 294 by a 10K MAX SPEED potentiometer 430.

Power Factor Correction circuit 296 is made up of a pair of diodes 432, 434, a 220K resistor 436, a 10K potentiometer 438 and a diode 440.

Referring now more particularly again to FIG. 10b, in the electric motor version, Signal Isolator circuit 298 is connected in place of clutch 32. Circuit 298 receives power from line 42 when terminal 166 is connected to terminal 442. Similarly, terminal 168 is connected to terminal 444 such that the output of driver circuit 24 on line 66 provides a RUN command on line 288. Signal Isolator circuit is made up of a pair of 1K resistors 446, 448, a diode 450, a type H11AV1A opto-isolator 452, available from General Electric. Circuit 298 also includes a 20K resistor 454, a 2K resistor 456, and a type MPS8098 transistor 458 available from Motorola.

PWM Control 290 utilizes a type UC3526 pulse width modulator control chip 460, available from Unitrode. Control 290 also includes a 1K resistor 462, a 0.1 uf capacitor 464, a soft start 1 uf capacitor 466, a 0.1 uf capacitor 468, a 4.7K resistor 470 and a 5K potentiometer 472. Potentiometer 472 is a current limit adjustment. A 4.02K resistor 474 is connected to the RT input of PWM chip 460. Resistor 474 in combination with a 0.0047 uf capacitor 476 set the operating frequency at 80 KHz. PWM Control 290 further includes a 10K resistor 478, a 0.1 uf capacitor 480, four 1N5819 type diodes 482, 484, 486, 488, a 0.1 uf capacitor 490, a 10 ohm resistor 492 and a pair of 4.7K resistors 494, 496. Diodes 482–488 and resistors 494 and 496 provide protection for integrated circuit 460 from transients generated in Power Output Section 284.

A Current Sense signal 500 from the Power Output Section 284 is provided to a 10.00 ohm ballast resistor 502, a 1K resistor 504, and a 0.001 uf capacitor 506.

Referring now to FIG. 10c, the details of the Power Output Section 284 may be seen. Section 284 includes a pair of 0.1 uf capacitor 508, 510, a pair of 0.0022 uf high current capacitors 512, 514, a 3K, 5 watt resistor 516 and a 5 uf capacitor 518. Current in lines 520, 522 is sensed by a 1:100 step-up ratio current transformer 524 having two one-turn primaries 526, 528 and a 100-turn secondary 530. Transformer 524 is preferably a model no. 500–1840 100:1 current transformer available from BH Electronics, Inc. at 12219 Woodlake Drive, Burnsville, Minn. 55337. An alternative transformer is a type PE51687 available from Pulse Engineering at 2200 E. Devon Ave. #179, Des Plaines, Ill. 60018. Secondary 530 is connected to a full wave bridge 532 made up of high speed diodes such as type 1N5819. The signal on line 500 is thus a rectified representation of inductor charging current.

Turning now to the Driver circuits 328, 330, type 1N4761A zener diodes 534, along with a 1N4757 zener diode 536 together with a 1N4937 conventional diode 538 and a 1K resistor 540 make up an input protection circuit which will turn on Drive circuit 330 and switching circuit 326 in the event an output voltage spike occurs in excess of the voltage supportable by the series connection of zener diodes. A 100 pf capacitor 542 provides noise suppression. A type MPS8098 transistor 544 and a type MPS8598 transistor 546, available from Motorola provide turn-on and turn-off capability for a type IRFIP450 FET transistor 548, available from International Rectifier, through a 47 ohm gate resistor 550. A 0.1 uf capacitor 552 is connected across transistors 544 and 546. A pair of 0.0022 uf high current capacitors 554 and 546 are connected to the respective outputs of switching circuits 324 and 326. The remainder of Drive circuit B 330 and its associated switching circuit 326 are made up of two additional banks of identical parts and hence are not further described. Similarly, Drive circuit A 328 is made up of parts identical to those described for circuit 330. Likewise switching circuit A 324 is made up of the same power FETS as transistor 548.

Referring now again to FIGS. 8 and 10a, 10b and 10c, the operation of alternative embodiment 10' is as follows. The operation of the pressure set and deadband control electronics 22 is the same as that for gasoline engine and electric clutch version of the system 10 shown in FIGS. 1–6, except that Driver circuit 24 no longer powers an electric clutch 32. Instead, circuit 24 provides the RUN command 288 through Signal Isolator 298 when the pressure control loop calls for operation of pump 16. RUN command 288 is supplied to a RUN-STOP input control terminal connected to line 288 (see FIG. 10b) which is connected to the RESET and SD (shut down) terminals of the pulse width modulator control chip 460. When operation of paint pump 16 is called for, Driver circuit 24 commands Signal Isolator 298 to turn on Opto-Coupler 452. This grounds the base of transistor 458, allowing line 288 to be pulled high by resistor 456. Chip 460 is thus enabled and will commence operation in a "soft-start" mode because of capacitor 466 connected to the CSS input terminal of chip 460. When the RUN command signal is present, PWM 460 is enabled, permitting operation of motor 280 in response to the presence of the RUN command signal. When the RUN command signal is absent, line 288 disables operation of the pulse width modulator 460 and motor 280. When line 288 receives the RUN command signal, PWM 460 is enabled and capacitor 466 provides controlled acceleration for the motor 280.

The innermost control loop of PWM Control 290 is a current control loop, operating on a pulse-by-pulse basis to limit current. The armature voltage error signal on line 560 (see FIGS. 8, 10a and 10b) causes PWM 460 to operate in a current control variable pulse width mode utilizing Power Output Section 284 to control current supplied to motor 280 up to a maximum current value set by current limit potentiometer 472. Electric Motor Control 282 includes Motor Speed Control 294 connected via line 560 to PWM Control 290 for regulating output shaft 38 of motor 280 to a desired speed. The Motor Speed Control 294 in effect regulates the voltage 300 supplied to motor 280 at terminal 382, 384. MAX SPEED adjustment 430 provides a speed reference against which the motor voltage on line 302 is matched by amplifier 418. Amplifier 418 together with its associated circuitry is connected in a high gain error amplifier configuration capable of holding motor speed relatively constant over at least a two-to-one range of voltage in the AC supply connected to terminals 336, 338. This provides good speed control for either 115 or 230 VAC operation.

It is to be understood that the AC input at plug 286 is converted to a direct current energy source by bridge 306 which full-wave rectifies the alternating current electrical supply to provide successive rectified half cycles of the AC supply. Bridge 306 thus provides a source of direct current energy having two terminals 380, 382. Power Output Section 284 also includes the pair of inductors 312, 314 acting as energy storage inductors and the pair of diodes 316, 318. As can be seen in FIG. 10c, each inductor is connected in series with one of the diodes and the inductor-diode series circuits are connected in a parallel circuit with each other. Motor 280 is connected in series with the parallel circuit at terminal 384 and is also connected to terminal 382 of the bridge or direct current energy source 306. First and second switching circuits 324, 326 each have ON and OFF states and each has first and second terminals with first terminal 522 of switching circuit 324 connected to node 320 between inductor 312 and diode 316. First terminal 520 of switching circuit 326 is connected to node 322 between inductor 314 and diode 318. The second terminals of switching circuits 324, 326 are each connected to circuit common 308 and to terminal 380 of bridge 306. Chip 460, along with its associated circuitry provides means for operating switching circuits 324 and 326 at a relatively high frequency such that current will build up in each inductor 312, 314 when the switching circuit connected to that inductor is on (i.e., the switch in FIG. 9 is closed) and the current built up in that inductor is subsequently delivered to motor 280 via the respective diode when the respective switching circuit is OFF (i.e., open circuit).

Figure 11:
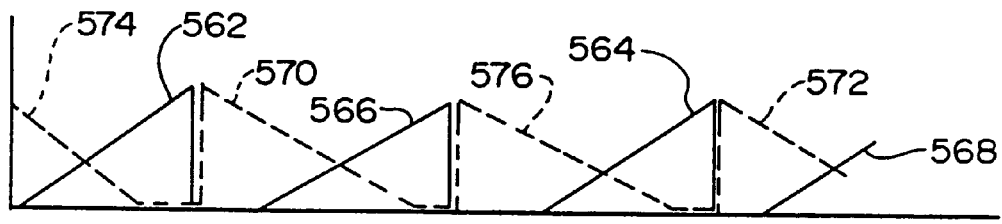
FIG. 11 shows current waveforms illustrating certain aspects of the PWM of the present invention.

Referring now also to FIG. 11, certain aspects of the operation of Power Output Section 284 may be seen. The current in inductor 312 will build up in a saw-toothed waveform made up of pulses 562, 564 when switching circuit 324 is ON. Similarly, the current will build up in inductor 314 in a fashion illustrated by pulses 566, 568. When the switching circuit (324, for example) turns OFF, the current in inductor 312 will be delivered to motor 280 via diode 316 in a saw-toothed waveform made up of pulses 570, 572. Similarly, current is delivered from inductor 314 to motor 280 via diode 318 when circuit 326 is open, as illustrated by pulses 574, 576. It can thus be seen that the total current in each inductor is a triangular waveform (made up of pulses 562 and 570 for inductor 312 and pulses 566, 576 for inductor 314). It is to be understood that the positive-going slope of the current build-up pulses will vary as a function of the instantaneous input voltage and the slope of the current pulses delivered to the motor will vary as a function of the motor conditions, primarily the instantaneous Back EMF of the motor at that time. It is to be further understood that although discontinuous current is shown in FIG. 11, i.e., where pulse 570 goes to zero before pulse 564 begins, certain modes of operation will result in continuous current in each of the inductors 312, 314 and it is further to be noted that motor current will appear most like the succession of pulses 574, 570, 576, 572, with some rounding because of capacitor 518 across motor terminals 382, 384. Energy in the form of current can thus be seen to be stored in each inductor during buildup pulses 562, 566, 564, 568 and the energy thus built up is subsequently delivered to the motor as indicated by the pulses shown in dashed lines. It may also be observed that the current buildup in one inductor, e.g., 562 overlaps the current 574 delivered to the motor by the other inductor.

Figure 12:
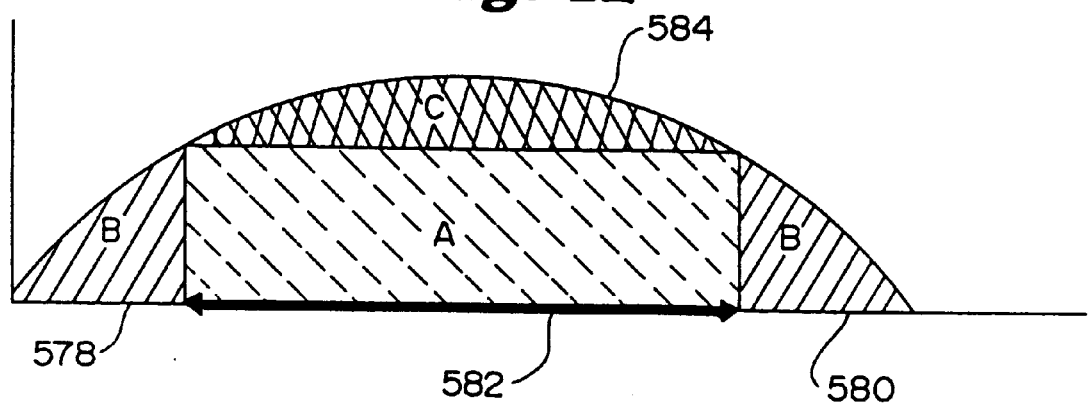
FIG. 12 shows a half-cycle of AC input current supplied to the system of FIG. 7 to illustrate further aspects of the present invention.

Referring now also to FIG. 12, the envelope of pulse width modulated motor current will be voltage limited at beginning and end portions 578, 580 of each half cycle of AC line voltage, illustrated by the hatched regions B. During an intermediate portion 582 of each half cycle illustrated by dashed hatch region or portion A, the motor current is regulated to a constant value. This mode of operation will exist when potentiometer 438 is adjusted such that diode 440 is connected to circuit common 308. Such a mode of operation has a relatively poor power factor as seen at input terminals 336, 338. To improve performance, a Power Factor Correction circuit 296 for correcting the input power factor of the control is provided by connecting diodes 432, 434 to the input AC waveform to provide a full-wave rectified AC sinusoid signal across resistor 436 and potentiometer 438 acting as a voltage divider. An adjustable portion of this sinusoidal voltage is added to the speed reference from potentiometer 430 during the intermediate portion of each half cycle, illustrated by cross hatched portion 584 (region C) in FIG. 12. This provides a sinusoidal shaped addition 584 to the desired speed during the intermediate portion 582 of each half cycle. Again, it is to be understood that FIG. 12 is illustrative of the envelope of motor (and input) current viewed over one-half cycle of AC line voltage.

It is further to be understood that the pressure set and deadband control electronics 22 are usable in a convertible fashion with either the gas engine and clutch prime mover or with the electric motor and PWM embodiment. To convert from the gas engine version, alternator 28 is disconnected, and bridge 360 replaces the alternator 28 of engine 30 when terminal 362 is connected to terminal 144 and terminal 364 is connected to terminal 146. The clutch winding 164 is disconnected in the conversion and terminal 442 is connected to terminal 166 (FIG. 3b) and terminal 444 is connected to terminal 168, thus converting driver circuit 24 into a driver circuit providing RUN command 288. Of course, appropriate mechanical conversion of gas engine 30 and clutch 32 to electric motor 280 must also accomplished. Driver circuit 24 thus may be seen to alternatively be connectable to operate an electric clutch when the piston pump is operated from an internal combustion engine and (alternatively) an electric motor control when the piston pump is operated from an electric motor.

The invention is not to be taken as limited to all of the details thereof as modifications and variations thereof may be made without departing from the spirit or scope of the invention. For example, the number of transistors in each drive circuit and power output section may be varied while still remaining within the scope of the invention.

What is claimed is:

1. An active alternative load circuit improvement for an electronic control for a piston pump operated from an internal combustion engine having an alternator, the active alternative load circuit improvement comprising:

a) a resistive load selectively connectable directly across an output of an alternator;

b) sensing means for sensing an output voltage of the alternator and providing an output indicative of whether the alternator output voltage is above or below a predetermined value; and c) switching means receiving the output of the sensing means and operative to:
      i) connect the resistive load directly to the output of the alternator when the alternator output voltage is above the predetermined value, and
      ii) disconnect the resistive load from the output of the alternator when the alternator output voltage is below the predetermined value.

2. The improved pressure control of claim 1 wherein the sensing means comprises a zener diode and resistor series circuit connected across the output voltage of the alternator such that the zener diode conducts above the predetermined value and does not conduct below the predetermined value.

3. The improved pressure control of claim 2 wherein the switching means comprises a transistor.

4. A method of limiting the voltage supplied by a gas engine driven alternator in the face of cyclical loads on an output of the alternator and the gas engine, the method comprising:

a) sensing an output voltage of the alternator; and
   b) actuating a switching means to:
      i) a first state when the alternator voltage is above the predetermined value such that the switching means is operative to directly connect a resistive load to the output of the alternator in the first state, and
      ii) a second state when the alternator voltage is below the predetermined value such that the switching means is operative to disconnect the resistive load from the output of the alternator in the second state.

5. The method of claim 4 wherein the switching means of step b) comprises actuating a transistor.

6. The method of claim 5 wherein the transistor is in a conducting condition in the first state and in a non-conducting condition in the second state.

7. The method of claim 4 wherein the output voltage of the alternator is sensed by a zener diode.

* * * * *